(12) United States Patent
Urban et al.

(10) Patent No.: US 6,241,814 B1
(45) Date of Patent: Jun. 5, 2001

(54) PROCESS FOR PREPARING QUINACRIDONE PIGMENTS

(75) Inventors: Manfred Urban, Wiesbaden; Martin Boehmer, Neu-Anspach; Dieter Schnaitmann, Eppstein; Joachim Weber, Frankfurt, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/351,223

(22) Filed: Jul. 12, 1999

(30) Foreign Application Priority Data

Jul. 10, 1998 (DE) ............................................. 198 31 097

(51) Int. Cl.$^7$ ......................... C09B 48/00; C09B 67/52; C09B 67/22; C09B 67/10
(52) U.S. Cl. ......................... 106/497; 106/495; 546/49
(58) Field of Search ................................. 106/495, 497; 546/49

(56) References Cited

U.S. PATENT DOCUMENTS

| | | | |
|---|---|---|---|
| 4,100,162 | 7/1978 | North | 106/497 |
| 4,655,845 | 4/1987 | Spietschka et al. | 106/309 |
| 4,986,852 | 1/1991 | Dietz et al. | 106/498 |
| 5,071,482 | 12/1991 | Dietz et al. | 106/498 |
| 5,248,774 | 9/1993 | Dietz et al. | 544/125 |
| 5,264,032 | 11/1993 | Dietz et al. | 106/411 |
| 5,466,807 | 11/1995 | Dietz et al. | 546/6 |
| 5,591,258 * | 1/1997 | Urban et al. | 106/497 |
| 5,614,014 | 3/1997 | Urban | 106/495 |
| 5,626,662 | 5/1997 | Urban | 106/497 |
| 5,662,739 | 9/1997 | Urban et al. | 106/497 |
| 5,746,820 | 5/1998 | Urban et al. | 106/471 |
| 5,755,872 | 5/1998 | Urban et al. | 106/497 |
| 5,755,874 | 5/1998 | Urban et al. | 106/497 |
| 5,800,607 | 9/1998 | Schnaitmann et al. | 106/412 |
| 5,958,129 | 9/1999 | Urban et al. | 106/498 |
| 5,989,333 | 11/1999 | Urban et al. | 106/495 |

FOREIGN PATENT DOCUMENTS

| | | |
|---|---|---|
| 0 799 862 | 10/1997 | (EP) . |
| 0 799 863 | 10/1997 | (EP) . |
| 0 863 186 | 9/1998 | (EP) . |
| 10-30062 * | 2/1998 | (JP) . |

OTHER PUBLICATIONS

EPO Search Report (Oct. 22, 1999).
Derwent Patent Abstract For Japan Patent No. 53039324 —XP–002118656 (4/1978).
EP Patent Office Abstract For Japan Patent No. 09110867 (4/1997).

* cited by examiner

*Primary Examiner*—Anthony Green
(74) *Attorney, Agent, or Firm*—Susan S. Jackson; Scott E. Hanf

(57) ABSTRACT

Linear unsubstituted and substituted quinacridone pigments and quinacridone mixed-crystal pigments are obtained by cyclizing dianilinoterephthalic acid with polyphosphoric acid and then hydrolyzing the ring closure mixture, said mixture being metered into an amount of water or orthophosphoric acid which is such that the final orthophosphoric acid concentration is greater than or equal to 50% by weight in the hedrolysis mixture.

17 Claims, No Drawings

PROCESS FOR PREPARING QUINACRIDONE PIGMENTS

CROSS-REFERENCES TO RELATED APPLICATIONS

The present invention is described in the German priority application No. 19831097.8, filed Jul. 10, 1998, which is hereby incorporated by reference as is fully disclosed herein.

BACKGROUND OF THE INVENTION

Quinacridone pigments have been known for a considerable time and have acquired great industrial importance for pigmenting coating materials and plastics. In practice, therefore, stringent requirements are placed on their fastness properties and coloristic properties. Consequently, the preparation and fine-division process is accorded great importance. For the preparation of quinacridone pigments there are two preferred synthesis routes. On the industrial scale, they are prepared by oxidizing dihydroquinacridones in an alkaline medium in the presence of solvents and then dry- or wet-grinding the resultant coarsely crystalline crude pigments or by subjecting 2,5-dianilinoterephthalic acids to ring closure in polyphosphoric acid or polyphosphoric ester and subsequently finishing the resultant finely divided crude pigment with organic solvents.

Depending on the synthesis route, the crude pigments are obtained either in finely divided or coarsely crystalline form. The crude pigments obtained in finely divided form do not require further fine division, whereas the coarsely crystalline crude pigments must undergo fine division prior to an optional finish treatment. Examples of such fine-division and finish procedures are acid pasting and dry and wet grinding. Combinations of these methods are also described.

The preparation of quinacridone pigments, mixed-crystal quinacridone pigments and quinacridone pigment preparations is described in the following patent documents:

DE-C-1 261 106 describes a process for improving the pigment properties of linear substituted quinacridones by subjecting substituted dianilinoterephthalic acids to ring closure in polyphosphoric acid and then subjecting the wet, finely divided crude pigments obtained after hydrolysis to a solvent finish at elevated temperature and pressure. This process employs large quantities of solvent, which require to be worked up and which make the process expensive.

JP-A-9-110 867 describes the preparation of substituted and unsubstituted quinacridone pigments by slow addition of 50–95% strength phosphoric acid to the polyphosphoric acid ring closure melt at from 140 to 170° C. until a final phosphoric acid concentration of from 90 to 95% is obtained. The coarsely crystalline crude pigments obtained must subsequently be converted to the pigment form by fine division and finishing. These additional steps make the process expensive.

EP-A-0 799 862 describes a process for preparing substituted and unsubstituted quinacridone pigments by high-temperature hydrolysis of the quinacridone ring closure mixtures at more than 110° C. in water or dilute aqueous phosphoric acid, until a final phosphoric acid concentration of less than 50% is obtained. In accordance with this procedure, the unsubstituted quinacridones are obtained in the β-phase.

A number of polymorphic phases of linear, unsubstituted quinacridone are known. Described are the α-phase (U.S. Pat. No. 2,844,484), the β-phase (U.S. Pat. No. 2,844,485), the γ-phase (U.S. Pat. No. 2,844,581), the δ-phase (U.S. Pat. No. 3,272,821), the ε-phase (JP-Patent 69-22 420), and the ζ-phase (DE-A 2 435 219).

Three phases of γ-quinacridone are described. The γI-phase is described in U.S. Pat. No. 3,074,950 and EP-A-0 267 877. In the X-ray spectrum, it shows three strong lines for twice the glancing angle 2θ, at 6.6°, 13.9° and 26.5°, three moderate lines at 13.2°, 13.5° and 23.8° and four weak lines at 17.1°, 20.5°, 25.2° and 28.6°. The γII-phase is described in U.S. Pat. No. 2,844,581 and in EP-A-0 267 877 and in DE-A-1 184 881. In the X-ray spectrum, it shows three strong lines for twice the glancing angle, 2θ, at 6.6°, 13.9° and 26.3°; five moderate lines at 13.2°, 13.4°, 23.6°, 25.2° and 28.3°, and two weak lines at 17.1° and 20.4°. The γIII-phase is described in JP-A 53-39 324. In the X-ray spectrum it shows three strong lines for twice the glancing angle, 2θ, at 6.2°, 13.6° and 26.5°; three moderate lines at 12.5°, 25.8° and 27.7°, and three weak lines at 16.5°, 20.5° and 24.0°. The moderate lines at 25.8° and 27.7° can be attributed to small amounts of α-phase.

DE-C 1 184 881 describes a process for preparing linear unsubstituted γII-phase quinacridone pigments by ring closure of 2,5-dianilinoterephthalic acid in polyphosphoric acid and subsequent hydrolysis in ice-water. The resultant crude quinacridones are subsequently treated with aqueous alkali and following isolation in the form of aqueous neutral pastes are heated at from 120 to 200° C. under pressure. The process is complex, since the finish is carried out in two stages.

JP-A 53-39324 describes the preparation of novel pigments of the γIII-phase of unsubstituted quinacridone by slow addition of water or dilute phosphoric acid to the polyphosphoric acid ring closure melt at from 70 to 140° C. until a final phosphoric acid concentration of from 62 to 90% is obtained. The coarsely crystalline crude pigments present following hydrolysis are subsequently converted to the pigmentary form by fine-division and finish processes.

SUMMARY OF THE INVENTION

The present invention provides a particularly environment-friendly and economic process for preparing linear, substituted and unsubstituted quinacridone pigments and also mixtures, mixed crystals and pigment preparations based on these pigments.

It is an object of the present invention to provide an environment-friendly, cost-effective and technically simplified process, which is not time consuming, for the preparation of quinacridone pigments of high purity, which overcomes the disadvantages of the prior art.

The invention provides a process for preparing pigments, mixed-crystal pigments and pigment preparations on the basis of linear unsubstituted or substituted quinacridones of the formula (I)

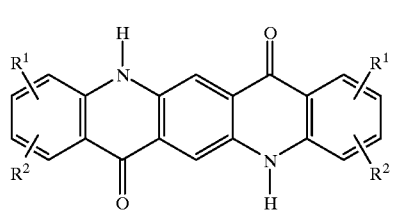

in which the substituents $R^1$ and $R^2$ are identical or different and are hydrogen, chlorine, bromine or fluorine atoms or $C_1$–$C_4$-alkyl, $C_1$–$C_4$-alkoxy or carboxamido groups, which can be substituted by $C_1$–$C_6$-alkyl groups; or are phenoxy rings or $C_6$–$C_{10}$-aryl rings onto which further aromatic, aliphatic or heterocyclic rings can be fused,
by cyclizing dianilinoterephthalic acid of the formula (Ia)

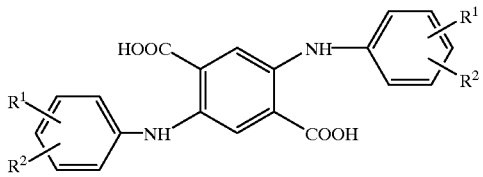

(Ia)

with polyphosphoric acid or polyphosphoric ester and subsequently hydrolyzing the ring closure mixture comprising quinacridone and polyphosphoric acid or polyphosphoric ester, which comprises metering the ring closure mixture comprising quinacridone and polyphosphoric acid or polyphosphoric ester into an amount of water or aqueous orthophosphoric acid which is such that the final orthophosphoric acid concentration in the resultant hydrolysis mixture is greater than or equal to 50% by weight.

DESCRIPTION OF THE PREFERRED EMBODIMENTS

For cyclizing the dianilinoterephthalic acid of the formula (Ia) it is generally the case that from 2.5 to 10 times the amount by weight, preferably from 3 to 5 times the amount by weight, of polyphosphoric acid or polyphosphoric ester, e.g., polyphosphoric acid methyl ester, is employed, based on the dianilinoterephthalic acid. The $P_2O_5$ content of the polyphosphoric acid or ester is judiciously between 80 and 87%, corresponding to a phosphoric acid equivalent of from 110 to 120%. Although larger amounts of said ring closure agent can be used, this is generally unnecessary. The ring closure temperature is judiciously from 80 to 150° C., preferably from 120 to 140° C.

The hydrolysis is carried out using water or aqueous orthophosphoric acid. Here, the ring closure mixture is metered, as it is or under pressure, into the water or the aqueous orthophosphoric acid. The hydrolysis temperature is judiciously between the freezing point of the aqueous phosphoric acid or water used for hydrolysis and 200° C., preferably from 20 to 150° C. Hydrolysis can be conducted continuously or batchwise. With advantage, it is conducted continuously in a static or mechanical mixer. Based on the polyphosphoric acid, from 0.2 to 10 times the amount of water or aqueous phosphoric acid is generally employed in order to attain the desired final concentration of orthophosphoric acid in the hydrolysis mixture, which is preferably between 75 and 98% by weight. The strength of the phosphoric acid employed is advantageously from 50 to 95% by weight, preferably from 75 to 90% by weight, since in this case the phosphoric acid concentration during hydrolysis will not fall below 50% by weight, preferably 75% by weight.

In the case of the unsubstituted quinacridone pigments of the formula (I), i.e., those where $R^1$ and $R^2$ are hydrogen, it is possible in accordance with the process of the invention to obtain the α-phase, the β-phase, or γ-phases. To obtain a γ-phase or the α-phase, the final orthophosphoric acid concentration in the hydrolysis mixture should be from 82.5 to 98% by weight, in particular from 84 to 95% by weight. Consequently, it is judicious in this case to employ orthophosphoric acid of strength of at least 82.5% by weight, in particular at least 84% by weight, so that during the hydrolysis the phosphoric acid concentration does not fall below 82.5% by weight. Predominantly α-phase of unsubstituted quinacridone pigment of the formula (I) is obtained if the hydrolysis temperature remains below 110° C. or only briefly rises to a temperature, for example, of up to 160° C. Any α-phase obtained can be transformed by thermal aftertreatment into a γ-phase; for example at temperatures of 110 to 200° C. for a period of 1 to 10 hours.

The β-phase of unsubstituted quinacridone pigment of the formula (I) is formed in particular when the final orthophosphoric acid concentration in the hydrolysis mixture is from 50 to 70% by weight. In the range between 70 and 82% by weight, it is possible for mixed phases to form to an increased extent.

The duration of the hydrolysis is dependent on the metering rate of the ring closure mixture.

The metered addition is advantageously carried out such that the concentration gradient is at or above 10% per minute, preferably above 20% per minute and, in particular, above 50% per minute. By the concentration gradient is meant the relative increase in the orthophosphoric acid concentration in the hydrolysis mixture in percent per unit time, based on the respective initial and final concentrations of the orthophosphoric acid in the hydrolysis mixture.

Following the end of the metered addition, it is usually advantageous to subject the hydrolysis mixture, which contains phosphoric acid, to an aftertreatment at temperatures from 20 to 200° C., preferably from 50 to 175° C., for a period of, judiciously, from 0.5 to 24 hours, preferably from 1 to 5 hours. It is, however, also possible to isolate the pigment, prepigment or crude pigment from the hydrolysis mixture after the end of hydrolysis, without said aftertreatment.

Depending on the hydrolysis and/or aftertreatment conditions employed, the resultant suspensions consist of pigments, finely divided prepigments or coarsely crystalline crude pigments, plus at least 50% strength phosphoric acid as liquid phase. Pigments are normally isolated directly by filtration. Before filtration, the phosphoric acid concentration can be reduced to below 40% by adding water or dilute phosphoric acid. Prepigments and crude pigments must be subjected to a further aftertreatment. Directly or following their isolation, prepigments are subjected to a thermal aftertreatment (finish) with or without addition of solvents at a temperature from 50 to 200° C. and then, following the removal of the solvent, are isolated. Coarsely crystalline crude pigments are subjected to mechanical fine division and then either the pigments obtained are isolated conventionally or the prepigments obtained are, with or without isolation, subjected to a finish treatment with or without additional solvents, at a temperature of from 50 to 200° C., and following the removal of the solvent are isolated.

The fine division can take place by dry or wet grinding. Preference is given to conducting wet grinding with a high energy input. Apparatus suitable for dry grinding includes all batch and continuous vibratory mills or roll mills, and for wet grinding all batch and continuous (stirred) ball mills, roll mills and vibratory mills, and also kneading apparatus. For wet grinding, the crude pigment suspensions—directly or following isolation, in the form of moist filtercakes or the dried, coarsely crystalline crude pigments—are diluted with water to a grindable consistency. Grinding media used are beads of zirconium oxide, zirconium mixed oxide, aluminum oxide, steel or quartz, with a diameter of from 0.2 to 20 mm. Ball mills are particularly suitable. For wet grinding in ball mills, a high grinding action is advantageous. Examples of ball mills which are suitable for grinding to the desired efficiency are those which are designed for batchwise or continuous operation, which have a cylindrical or hollow-cylindrical milling chamber in horizontal or vertical construction, which can be operated at a specific power density of more than 1.0 kW per liter of milling space and with grinding media with a diameter of less than 1 mm, and whose stirrer tip speed is more than 12 m/s. The constructional design ensures that the high grinding energy is transferred to the millbase. Preliminary experiments are necessary in order to determine the appropriate grinding conditions. Grinding is conducted preferably in an aqueous medium and within the alkaline pH range. It can also be conducted in homogeneous mixture in an aqueous medium with the addition of small amounts of an organic solvent, preferably up to 10% by weight, based on the total millbase. It is also possible to carry out grinding in an organic medium.

Grinding is conducted at temperatures in the range from 0 to 100° C., judiciously at a temperature between 10 and 60° C. and, preferably, at from 20 to 50° C.

The pigment concentration in the millbase depends on the rheology of the suspension and is judiciously not more than 30%, preferably from 5 to 25% and, in particular, from 7.5 to 20%, of the millbase suspension.

Suitable inorganic bases are sodium hydroxide, potassium hydroxide, sodium carbonate, potassium carbonate, and ammonia. Mixtures of these bases can also be used.

Besides the liquid phase and the crude pigment, the millbase can also include pigment dispersants, surfactants, defoamers, and additives.

The duration of grinding is dependent on the fineness requirement for the particular area of application: for example, the paints, printing or plastics sector. Depending on the required fineness, the residence of the millbase within the ball mill is generally between 5 and 150 minutes. A duration of from 5 to 45 minutes, preferably from 10 to 30 minutes, proves juicious.

The prepigments present following hydrolysis and, if appropriate, following fine division are subjected to a finish treatment in aqueous suspension, neutral, acidic or alkaline, with or without addition of solvents, or in an organic medium. The conditions to be observed for conducting the finish treatment are dependent to a large extent on the target properties of the pigments and are in each case oriented to said properties. It is normal for the suspension of the prepigments to be treated in the medium in question at a temperature in the range between 50 and 200° C. for from 1 to 24 hours, under increased pressure if desired. In general, this is done using the suspension obtained after wet grinding, without isolation of the millbase. The amount of solvent added in this case can fluctuate within wide limits. It is preferred to use from an equal amount to 5 times the amount by weight of solvent, based on the weight of the prepigments. The thermal treatment in an aqueous, aqueous-organic or organic medium takes place preferably at from 50 to 150° C. for from 1 to 6 hours. When the finish operation is at an end, the solvents used for said operation can be recovered by distillation and used again. Utilizing the possibilities for variation that are available in this way the prepigments obtained in accordance with the process of the invention can, depending on the intended utility, be converted to a more hiding or more transparent form or to a different phase, which can be controlled by way of the solvency of the solvent in question, by its concentration, by the selection of temperature and by the duration of the finish treatment. The solvents in question are described below.

In order to obtain certain coloristic effects it is possible to add a peroxodisulfate to the isolated crude pigment or prepigment and to heat the system to more than 60° C. Based on the crude pigment or prepigment, from 1 to 10% by weight of peroxodisulfate are added in this case, in solid form or in the form of an aqueous-alkaline solution. The amount of alkali consumed by the oxidation with peroxodisulfate is compensated by the addition of alkali prior to or during the oxidation.

Sodium, potassium or ammonium peroxodisulfate is suitable for this aftertreatment. Suitable surfactants include anionic, cationic and nonionic surfactants. Suitable anionic surfactants include fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, e.g., palmitic, stearic and oleic acid, soaps, e.g., alkali metal salts of fatty acids, naphthenic acids and resin acids, e.g., abietic acid, and alkali-soluble resins, e.g., rosin-modified maleate resins.

Suitable cationic surfactants include quaternary ammonium salts, fatty amine ethoxylates, fatty amino polyglycol ethers, and fatty amines. Suitable nonionic surfactants include fatty alcohol polyglycol ethers, fatty acid polyglycol esters, and alkylphenol polyglycol ethers.

Pigment dispersants which are employed in connection with the process include compounds of the formula (II)

P—X$m$                (II)

in which

P is an m-valent radical of a linear quinacridone of the above-described formula (I), in which $R^1$ and $R^2$ are identical or different and are hydrogen atoms or methyl groups, X is a group of the formula (III)

—COOM              (III)

or a group of the formula (IV)

—SO$_3$M               (IV)

in which

M is the hydrogen ion H$^+$ or the equivalent M$^{r+}$/r of an r-valent metal cation, where r, for the case in question, is accordingly one of the numbers 1, 2 and 3, such as, for example, Li$^{1+}$, Na$^{1+}$, K$^{1+}$, Mg$^{2+}$, Ca$^{2+}$, Sr$^{2+}$, Ba$^{2+}$, Mn$^{2+}$, Cu$^{2+}$, Ni$^{2+}$, Co$^{2+}$, Zn$^{2+}$, Fe$^{2+}$, Al$^{2+}$, Cr$^{3+}$ or Fe$^{3+}$; or defines an ammonium ion having the structure N$^+$R$^3$R$^4$R$^5$R$^6$, the substituents R$^3$, R$^4$, R$^5$ and R6 on the quaternary nitrogen atom being identical or different and being hydrogen atoms or C$_1$–C$_{30}$-alkyl, C$_2$–C$_{30}$-alkenyl or C$_5$–C$_{30}$-cycloalkyl groups which can be substituted by hydroxyl, di(C$_1$–C$_4$-alkyl)amino, carboxyl or carboxamido groups, or can be a polyoxyalkylene group of the type —(CHR$^{14}$—CH$_2$—O—)$_k$—H, in which R$^{14}$ is hydrogen or C$_1$–C$_4$-alkyl and k is a number from 1 to 30, or X is a group of the formula (V)

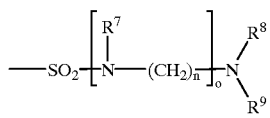

(V)

in which $R^8$ and $R^9$ independently of one another are each a hydrogen atom, a $C_1$–$C_{20}$-alkyl, $C_2$–$C_{20}$-alkenyl or $C_5$–$C_7$-cycloalkyl group, or in which $R^8$ and $R^9$, together with the adjacent nitrogen atom, form an aliphatic or aromatic, five- or six-membered heterocyclic system having in each case 1 to 3 ring members comprising identical or different heteroatoms from the series consisting of nitrogen, oxygen and sulfur, $R^7$ is a hydrogen atom or a $C_1$–$C_4$-alkyl group, n is a number from 1 to 6, and o is 0 or 1; or X is a group of the formula (VI)

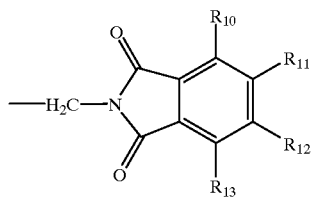

(VI)

in which $R^{10}$, $R^{12}$ and $R^{13}$ are a hydrogen, fluorine, chlorine or bromine atom and $R^{11}$ is a hydrogen, fluorine, chlorine or bromine atom or a nitro, $C_1$–$C_5$-alkyl, $C_1$–$C_6$-alkoxy or benzoylamino group, and m is a number from 1 to 4.

Preference is given to pigment dispersants of the general formula (II) in which P is the radical of unsubstituted linear quinacridone and X is the phthalimidomethylene group or the sulfonamide group.

Examples of suitable organic solvents are as follows: alicyclic hydrocarbons such as cyclohexane; $C_1$–$C_8$-alkanols and alicyclic alcohols such as methanol, ethanol, n-propanol or isopropanol, n-butanol or isobutanol, tert-butanol, pentanols, hexanols, cyclohexanol; ethylene glycol, propylene glycol, glycerol; $C_1$–$C_5$-dialkyl ketones or cyclic ketones, such as acetone, diethyl ketone, methyl isobutyl ketone, methyl ethyl ketone or cyclohexanone; ethers and glycol ethers, such as the monomethyl or monoethyl ether of ethylene glycol and of propylene glycol, or butylglycol, ethyidiglycol or methoxybutanol; aromatic hydrocarbons such as toluene, xylenes or ethylbenzene, cyclic ethers such as tetrahydrofuran, aromatic chlorinated hydrocarbons such as chlorobenzene, o-dichlorobenzene, 1,2,4-trichlorobenzene, or bromobenzene; substituted aromatics such as benzoic acid, nitrobenzene or phenol; aliphatic carboxamides such as formamide, dimethylacetamide or dimethylformamide; cyclic carboxamides, such as N-methylpyrrolidone; $C_1$–$C_4$-alkyl carboxylates, such as butyl formate, ethyl acetate or propyl propionate; carboxylic acid $C_1$–$C_4$ glycol esters, phthalic acid $C_1$–$C_4$-alkyl esters and benzoic acid $C_1$–$C_4$-alkyl esters, such as ethyl benzoate; heterocyclic bases such as pyridine, quinoline, morpholine or picoline; and also dimethyl sulfoxide and sulfolane.

Preferred organic solvents are alkanols, especially ethanol, propanols, butanols and pentanols; aliphatic carboxamides, especially dimethylformamide or dimethylacetamide; cyclic carboxamides, especiallly N-methylpyrrolidone; aromatic hydrocarbons such as toluene, xylenes or ethylbenzene; aromatic chlorinated hydrocarbons such as chlorobenzene or o-dichlorobenzene, for example, and dimethyl sulfoxide.

The preparation of quinacridone pigments by the process of the invention has proven particularly economic and environment-friendly, since in the hydrolysis the hydrolysis products can be obtained directly as pigments, or coarsely crystalline crude pigments are obtained which can be converted to the pigmentary form by mechanical fine-division methods even in the absence of solvents. Only small amounts of chemicals and solvents need be employed, and subsequently can be processed further or fully regenerated. Therefore, there are no waste disposal problems. The wet grinding of the crude pigments does not give rise to any air pollution owing to dust development.

To improve the coloristic properties and to obtain particular coloristic effects it is possible at any point in the process to add solvents, pigment dispersants, surfactants, defoamers, extenders or other additives. It is also possible to use mixtures of these additives. The additives can be added all in one go or in a number of portions. The addition can be made before, during or after ring closure, during hydrolysis, grinding or the finish treatment, or during or after isolation. The most suitable point in time must be determined beforehand by means of guideline experiments.

It was surprising and unforeseeable that quinacridones of very high purity can be obtained directly in pigmentary form if, during the hydrolysis of the ring closure mixture, the final phosphoric acid concentration is more than 50% by weight, whereas according to EP-A-0 799 862 quinacridone pigments are obtained only in dilute phosphoric acid and at final phosphoric acid concentrations of less than 50%.

It was also surprising and unforeseeable that when during the hydrolysis of the ring closure mixture the final phosphoric acid concentration is more than 82.5% by weight the hydrolysis product—in the case of the unsubstituted quinacridone of the formula (I)—is obtained directly, or at least following a thermal aftertreatment, in the γ-phase. In accordance with EP-A-0 799 862, hydrolysis of the ring closure mixture in water or aqueous phosphoric acid up to a final phosphoric acid concentration of below 50% by weight produces the β-phase. This is all the more surprising since at the beginning of the hydrolysis of the invention it is possible to pass through the phosphoric acid concentration range stated in EP-A-0 799 862. Furthermore, the β-phase pigments prepared in accordance with EP-A-0 799 862 can no longer be converted into γ-phase pigments by thermal aftertreatment with concentrated—e.g., 85% strength—phosphoric acid.

The pigments and pigment preparations obtained in accordance with the process of the invention possess properties which cannot be achieved with the pigments prepared with hydrolysis at a lower final phosphoric acid concentration.

The pigments obtainable in accordance with the present invention are notable for their outstanding coloristic and rheological properties, and in particular their high color strength, high purity, high flocculation stability, ready dispersibility, and excellent luster.

The pigments prepared in accordance with the invention can be used for the pigmentation of organic materials of high molecular mass, of either natural or synthetic origin.

Examples of high molecular mass organic materials which can be pigmented with these pigments are cellulose ethers and cellulose esters, such as ethylcellulose, nitrocellulose, cellulose acetate or cellulose butyrate, natural or synthetic resins, such as addition polymerization resins or condensation resins, e.g., amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

It is unimportant in this context where the high molecular mass organic compounds mentioned are in the form of plastic masses or melts or in the form of spinning solutions, lacquers, paints or printing inks. Depending on the intended use it may prove advantageous to use the pigments that have been obtained in accordance with the invention as blends or in the form of preparations or dispersions. Based on the high molecular mass organic material to be pigmented, the pigments of the invention are employed in an amount of preferably from 0.1 to 10%.

In order to assess the properties in the paints sector of the pigments prepared in accordance with the invention, a selection was made, from among the large number of known lacquers, of an alkyd-melamine resin lacquer (AM) based an a medium-oil alkyd resin and on a butanol-etherified melamine resin and containing aromatic compounds, a polyester lacquer (PE) based on cellulose acetobutyrate and a melamine resin, and an aqueous lacquer based on polyurethane (PU).

In order to assess the properties in the plastics sector of the pigments prepared in accordance with the present invention, plasticized polyvinyl chloride(PVC) was selected from among the large number of known plastics.

In order to assess the properties in the printing sector of the pigments prepared in accordance with the invention, an intaglio printing system based on nitrocellulose (NC print) was selected from among the large number of known printing systems. The color strength and color shade were determined in accordance with DIN 55986. The rheology of the millbase following dispersion was evaluated using the following five-point scale:

5 highly fluid
4 fluid
3 viscous
2 slightly set
1 set

After dilution of the millbase to the final pigment concentration, the viscosity was measured using the Rossmann Viscospatula, type 301 from Erichsen. Gloss measurements were made on cast films at an angle of 20° in accordance with DIN 67530 (ASTMD 523) using the "multigloss" gloss meter from Byk-Mallinckrodt. The determination of solvent fastness was in accordance with DIN 55976. The determination of overcoating fastness was in accordance with DIN 53221. The determination of bleed fastness was in accordance with DIN 53775. The determination of the crystal phase of the crude pigments, prepigments, pigments, mixed-crystal pigments and pigment preparations was carried out by means of X-ray spectroscopy. The X-ray spectra were recorded using Cu Kα· radiation. The X-ray diffraction spectra are reproduced in digital form. The relative intensities of strong lines are 51–100%, of moderate lines 11–50% and of weak lines 2–10%.

In the above text and in the Examples below, parts and percentages are in each case by weight for the substances so described.

EXAMPLES

Examples of Unsubstituted Quinacridones

Example 1

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. For hydrolysis, the reaction mixture is then metered over the course of 2 minutes into a second stirred vessel containing 2039 parts of 85% strength phosphoric acid and the mixture is stirred at 145° C. During hydrolysis, the temperature rises to 160° C. Following hydrolysis, the phosphoric acid strength is 90%. The mixture is cooled to 150° C. and stirred at 150° C. for 4 hours. It is then cooled to 90° C. and the crude pigment is filtered off with suction, washed with 85% strength phosphoric acid until the runoff is colorless, then washed to neutrality with water and dried at 80° C. This gives 64.9 parts of coarsely crystalline crude pigment (C.I. Pigment Violet 19, γIII-phase). The X-ray spectrum shows two strong lines for twice the glancing angle, 2θ, at 6.2° and 13.7°, two moderate lines at 12.5° and 26.7°, and two weak lines at 16.4° and 20.7°. In the AM lacquer, clean and strongly colored coatings of high opacity are obtained.

Example 2

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. Subsequently, the reaction mixture is cooled to 100° C., metered over the course of 5 minutes into a second stirred vessel containing 2039 parts of 85% strength phosphoric acid and the mixture is hydrolyzed at 100° C. During hydrolysis, the temperature rises to 125° C. Following hydrolysis, the phosphoric acid strength is 90%. The mixture is cooled to 120° C. and stirred at 120° C. for 4 hours. It is then cooled to 90° C. and the pigment is filtered off with suction, washed with 50% strength phosphoric acid until the runoff is colorless, then washed to neutrality with water and dried at 80° C.

This gives 72.3 parts of pigment (C.I. Pigment Violet 19, α-phase). The X-ray spectrum shows one strong line for twice the glancing angle, 2θ, at 6.3°, five moderate lines at 12.5°, 14.0°, 25.8°, 27.3° and 28.1°, and six weak lines at 11.8°, 16.6°, 20.8°, 22.1°, 24.2° and 30.2°. In the AM lacquer, highly transparent, deeply colored and strongly colored coatings are obtained. The shade is much bluer than that of the coatings of the γII- and γIII-phases.

Example 3

A pressure vessel is charged with 650.3 parts of polyphosphoric acid containing 85.0% $P_2O_5$. Then 125.8 parts of 2,5-dianilinoterephthalic acid are introduced with stirring at 80 to 90° C., and the mixture is heated to 125° C. and heated at 125° C. for 1 hour during which ring closure takes place to form the quinacridone. The reaction mixture is then metered in 10 seconds into a second pressure vessel containing 184 parts of water and the mixture is hydrolyzed under pressure at 150° C. with stirring. During hydrolysis, the temperature rises to 172° C. Following hydrolysis, the phosphoric acid strength is 90%. The mixture is cooled to 150° C. and stirred at 150° C. for 2 hours. It is then cooled to 90° C. and the pigment is filtered off with suction, washed with 85% strength phosphoric acid until the runoff is colorless, then washed to neutrality with water and dried at 80° C. This gives 112.7 parts of pigment (C.I. Pigment Violet 19, γIII-phase with traces of α-phase). In the AM lacquer, transparent, deeply colored and strongly colored coatings are obtained.

Example 4

A pressure vessel is charged with 370.5 parts of polyphosphoric acid containing 85.0% $P_2O_5$. Then 74.1 parts of 2,5-dianilinoterephthalic acid are introduced with stirring at 80 to 90° C., and the mixture is heated to 125° C. and heated at 125° C. for 1 hour during which ring closure takes place to form the quinacridone. The reaction mixture is then metered in 10 seconds into a second pressure vessel containing 980 parts of 40% strength phosphoric acid and the mixture is hydrolyzed under pressure at 150° C. with stirring. During hydrolysis, the temperature rises to 170° C. Following hydrolysis, the phosphoric acid strength is 60%. The mixture is cooled to 150° C. and stirred at 150° C. for 4 hours. It is then cooled to 90° C. and the hydrolysis mixture is filtered off with suction, washed with 60% strength phosphoric acid until the runoff is colorless, then washed to neutrality with water and dried at 80° C.

This gives 66.4 parts of pigment (C.I. Pigment Violet 19, β-phase). The X-ray spectrum shows two strong lines for twice the glancing angle, 2θ, at 5.8° and 27.0°, three moderate lines at 11.6°, 16.0° and 21.8°, and four weak lines at 13.7°, 23.5°, 29.4° and 31.8°.

Example 5

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 2269 parts of 82.5% strength phosphoric acid and the mixture is hydrolyzed with stirring at 140° C. During hydrolysis, the temperature rises to 160° C. Following hydrolysis, the phosphoric acid strength is 87.8%. The mixture is cooled to 145° C. and stirred at 145° C. for 4 hours. It is then cooled to 90° C. and the pigment is filtered off with suction, washed with 85% strength phosphoric acid until the runoff is colorless, then washed to neutrality with water and dried at 80° C.

This gives 67.2 parts of pigment (C.I. Pigment Violet 19, γIII-phase with traces of α-phase). In the AM lacquer, deeply colored and strongly colored coatings of high transparency are obtained. The fastness to overcoating is excellent.

Example 6

A stirred vessel is charged with 450 parts of polyphosphoric acid containing 85.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 2250 parts of 85% strength phosphoric acid and the mixture is hydrolyzed with stirring at 145° C. During hydrolysis, the temperature rises to 160° C. Following hydrolysis, the phosphoric acid strength is 90%. The mixture is cooled to 150° C. and stirred at 150° C. for 4 hours. It is then cooled to 90° C. and the crude pigment is filtered off with suction, washed with 85% strength phosphoric acid until the runoff is colorless, then washed to neutrality with water and dried at 80° C.

This gives 69.6 parts of crude pigment (C.I. Pigment Violet 19, γIII-phase with traces of α-phase).

A stainless steel container filled to 55% of its volume with 3256 parts of stainless steel beads with a diameter of 10 mm as grinding media is charged with 13 parts of crude pigment and 117 parts of dimethylformamide. Grinding is carried out for 24 hours on a roller table at 75% of the critical speed. The millbase is subsequently sieved to remove the grinding media, and the pigment is filtered off with suction, washed with water until free of dimethylformamide, and dried at 80° C.

This gives 13 parts of pigment (C.I. Pigment Violet 19, γII-phase). The X-ray spectrum shows three strong lines for twice the glancing angle, 2θ, at 6.5°, 13.8° and 26.4°, nine moderate lines at 13.1°, 13.4°, 15.9°, 17.0°, 20.4°, 23.7°, 25.0°, 26.6° and 28.5°, and five weak lines at 21.8°, 27.9°, 30.5°, 31.7° and 33.1°. In the plastic (PVC), strong colorations are obtained with very good dispersibility. The bleed fastness is excellent. In the AM lacquer, strongly colored coatings of high opacity are obtained. The rheology is evaluated as being 5 and the viscosity is 4.0 s.

Example 7

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 2039 parts of 85% strength phosphoric acid and the mixture is hydrolyzed with stirring at 145° C. During hydrolysis, the temperature rises to 160° C. Following hydrolysis, the phosphoric acid strength is 90%. The mixture is cooled to 150° C. and stirred at 150° C. for 4 hours. It is then cooled to 90° C. and the crude pigment is filtered off with suction, washed with 85% strength phosphoric acid until the runoff is colorless, then washed to neutrality with water and dried at 80° C.

This gives 64.9 parts of coarsely crystalline crude pigment (C.O. Pigment Violet 19, γII-phase).

A ball mill (manufacturer: Draiswerke GmbH, Mannheim) filled with 342 parts of zirconium mixed-oxide beads with a diameter of 0.3–0.4 mm as grinding media is charged with a suspension consisting of 90 parts of water and 10 parts of coarsely crystalline crude pigment. Grinding is carried out at a tip speed of 15.6 m/s and with a specific power density of 3.1 kW per liter of milling space at 25° C. for 10 minutes. The millbase suspension is subsequently sieved to remove the grinding media, which are rinsed with water, and the combined millbase suspensions are filtered off with suction, and the solid product is washed with water and dried at 80° C. This gives 9.9 parts of pigment (C.I. Pigment Violet 19, γIII-phase with small amounts of α-phase).

9 parts of pigment are mixed mechanically with 1 part of pigment dispersant of the formula (II). In this formula (II) P is the radical of linear unsubstituted quinacridone and X the sulfonamide group (V) in which $R^7$ is a hydrogen atom, $R^8$ and $R^9$ are each an ethyl group, n is 3.0, o is 1.0 and m is 2.0. This gives a pigment preparation. In the AM lacquer, transparent clean and strongly colored coatings are obtained.

Example 8

A stirred vessel is charged with 450 parts of polyphosphoric acid containing 85.0% $P_2O_5$. Then 150 parts of 2,5-dianilinoterephthalic acid are introduced with stirring at 125° C. and the mixture is stirred at 125° C. for 1 hour during which ring closure takes place to form the quinacridone. The reaction mixture is then metered over the course of 5 minutes into a second stirred vessel containing 1713 parts of 90% strength phosphoric acid and the mixture is hydrolyzed with stirring at 60° C. During hydrolysis, the temperature rises to 85° C. Following hydrolysis, the phosphoric acid strength is 95%. The mixture is heated to 100° C. and stirred at 100° C. for 4 hours. The crude pigment is filtered off with suction and washed with 85% strength phosphoric acid until the runoff is colorless, then washed to neutrality with water and dried at 80° C.

This gives 120.4 parts of crude pigment (C.I. Pigment Violet 19, γIII-phase).

A porcelain container which is filled to 90% of its volume with 1200 parts of quartzite beads with a diameter of 2–3 mm as grinding media is charged with 200 parts by volume of ethanol and 20.0 parts of crude pigment (C.I. Pigment Violet 19, γIII-phase). Fine grinding is carried out for 8 hours with shaking on a vibratory mill (model: Vibratom; manufacturer: Siebtechnik Mühlheim) at 1400 revolutions per minute, circle of vibration 4 mm. The millbase is subsequently sieved to remove the grinding media. The grinding media are rinsed off with ethanol and the combined millbase suspensions are evaporated to dryness.

This gives 19.5 parts of pigment (γII-phase).

9.5 parts of pigment are mixed mechanically with 0.5 parts of pigment dispersant of the formula (II). In this formula (II) P is the radical of linear unsubstituted quinacridone and X the sulfonamide group (V) in which $R^7$ is a hydrogen atom, $R^8$ and $R^9$ are each an ethyl group, n is 3.0, o is 1.0 and m is 2.0.

This gives a pigment preparation. In the AM lacquer, opaque very clean and strongly colored coatings are obtained. The rheology is evaluated as being 5 and the viscosity is 3.1 s. The gloss measurement gives a value of 84.

Example 9

A stirred vessel is charged with 450 parts of polyphosphoric acid containing 85.0% $P_2O_5$. Then 150 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 1713 parts of 90% strength phosphoric acid and the mixture is hydrolyzed with stirring at 60° C. During hydrolysis, the temperature rises to 85° C. Following hydrolysis, the phosphoric acid strength is 95%. The mixture is heated to 100° C. and stirred at 100° C. for 4 hours. The crude pigment is filtered off with suction, washed with 85% strength phosphoric acid until the runoff is colorless, then washed to neutrality with water and dried at 80° C. This gives 120.4 parts of crude pigment (C.I. Pigment Violet 19, γIII-phase).

A stainless steel container filled to 55% of its volume with 1070 parts of porcelain beads with a diameter of 10 mm as grinding media is charged with 30 parts of crude pigment, 1 part of ethanol and 1.5 parts of pigment dispersant of the formula (II). In this formula (II) P is the radical of linear unsubstituted quinacridone and X is the sulfonamide group (V) in which $R^7$ is a hydrogen atom, $R^8$ and $R^9$ are each an ethyl group, n is 3.0, o is 1.0 and m is 2.0. Grinding is carried out for 24 hours on a roller table at 56% of the critical speed. The millbase is subsequently sieved to remove the grinding media, and dried at 80° C.

This gives 28.9 parts of pigment preparation (C.I. Pigment Violet 19, γIII-phase). In the AM lacquer, clean and strongly colored coatings of high transparency are obtained. The rheology is evaluated as being 5 and the viscosity is 2.9 s. The gloss measurement gives a value of 76.

Example 10

A stirred vessel is charged with 450 parts of polyphosphoric acid containing 85.0% $P_2O_5$. Then 150 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 1713 parts of 90% strength phosphoric acid and the mixture is hydrolyzed with stirring at 160° C. During hydrolysis, the temperature rises to 175° C. Following hydrolysis, the phosphoric acid strength is 95%. The mixture is heated to 100° C. and stirred at 100° C. for 4 hours. Then the mixture is cooled to 125° C. and the crude pigment is filtered off with suction and washed with 85% strength phosphoric acid until the runoff is colorless, then washed to neutrality with water and dried at 80° C.

This gives 110.4 parts of crude pigment (C.I. Pigment Violet 19, γIII-phase). A porcelain container which is filled to 90% of its volume with 1200 parts of quartzite beads with a diameter of 2–3 mm as grinding media is charged with 200 parts by volume of acetone and 20.0 parts of crude pigment (C.I. Pigment Violet 19, γIII-phase). Fine grinding is carried out for 8 hours with shaking on a vibratory mill (model: Vibratom; manufacturer: Siebtechnik Mühlheim) at 1400 revolutions per minute, circle of vibration 4 mm. The millbase is subsequently sieved to remove the grinding media. The grinding media are rinsed off with acetone and the combined millbase suspensions are evaporated to dryness.

This gives 19.2 parts of pigment (γII-phase). In the AM lacquer, opaque clean and strongly colored coatings are obtained.

Example 11

A stirred vessel is charged with 450 parts of polyphosphoric acid containing 85.0% $P_2O_5$. Then 150 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 574 parts of 80% strength phosphoric acid and the mixture is hydrolyzed with stirring at 50° C. During hydrolysis, the temperature rises to 115° C. Following hydrolysis, the phosphoric acid strength is 96.4%. The mixture is heated to 150° C. and stirred at 150° C. for 4 hours. It is then cooled to 90° C. and the crude pigment is filtered off with suction, washed with 85% strength phosphoric acid until the runoff is colorless, then washed to neutrality with water and dried at 80° C. This gives 118.9 parts of coarsely crystalline crude pigment (C.I. Pigment Violet 19, γIII-phase).

A ball mill (manufacturer: Draiswerke GmbH, Mannheim) filled with 400 parts of zirconium mixed-oxide beads with a diameter of 0.3–0.4 mm as grinding media is charged with a suspension consisting of 90 parts of 5% isobutanol and 10 parts of coarsely crystalline crude pigment. Grinding is carried out at a tip speed of 15.6 m/s and with a specific power density of 3.1 kW per liter of milling space at 20° C. for 20 minutes. The millbase suspension is subsequently sieved to remove the grinding media, which are washed with water, and the millbase suspensions are combined. The combined suspensions are heated to boiling and the isobutanol is distilled off at up to 100° C. at the bridge. After cooling to 60° C., the pigment is filtered off with suction, washed with water and dried at 80° C.

This gives 9.9 parts of pigment (C.I. Pigment Violet 19, γIII-phase with small amounts of α-phase). In the AM lacquer, transparent, clean and strongly colored coatings are obtained.

Example 12

A stirred vessel is charged with 450 parts of polyphosphoric acid containing 85.0% $P_2O_5$. Then 150 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 574 parts of 80% strength phosphoric acid and the mixture is hydrolyzed with stirring at 50° C. During hydrolysis, the temperature rises to 115° C. Following hydrolysis, the phosphoric acid strength is 96.4%. The mixture is heated to 150° C. and stirred at 150° C. for 4 hours. It is then cooled to 90° C. and the crude pigment is filtered off with suction, washed with 85% strength phosphoric acid until the runoff is colorless, then washed to neutrality with water and dried at 80° C.

This gives 118.9 parts of coarsely crystalline crude pigment (C.I. Pigment Violet 19, γIII-phase with small amounts of α-phase).

A ball mill (manufacturer: Draiswerke GmbH, Mannheim) filled with 405 parts of zirconium mixed-oxide beads with a diameter of 0.3–0.4 mm as grinding media is charged with a suspension consisting of 90 parts of water and 10 parts of coarsely crystalline crude pigment. Grinding is carried out at a tip speed of 15.6 m/s and with a specific power density of 3.1 kW per liter of milling space at 20° C. for 20 minutes. The millbase suspension is subsequently sieved to remove the grinding media, which are washed with water, and the combined millbase suspensions are filtered with suction.

This gives 25.4 parts of 39.3% strength filtercake.

For the finish treatment, the filtercake is introduced into 84.6 parts of water. Thereafter, 50 parts of 100% isobutanol and 0.5 part of pigment dispersant of the formula (II) are added. In this formula (II) P is the radical of the linear unsubstituted quinacridone and X is the sulfonamide group (V) in which $R^7$ is a hydrogen atom, $R^8$ and $R^9$ are each an ethyl group, n is 3.0, o is 1.0 and m is 2.0. The combined suspensions are heated to boiling, stirred at boiling temperature for 3 hours, and then the isobutanol is distilled off at up to 100° C. at the bridge. After cooling to 60° C., the pigment preparation is filtered off with suction, washed with water and dried at 80° C. This gives 9.9 parts of pigment preparation. In the AM lacquer, transparent, clean and strongly colored coatings are obtained. The rheology is evaluated as being 5 and the viscosity is 3.5 s. The gloss measurement gives a value of 78.

Example 13

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 790 parts of 85% strength phosphoric acid and the mixture is hydrolyzed with stirring at 145° C. During hydrolysis, the temperature rises to 160° C. Following hydrolysis, the phosphoric acid strength is 95%. The mixture is cooled to 145° C. and stirred at 145° C. for 10 hours. It is then cooled to 90° C. and the crude pigment is filtered off with suction, washed with 85% strength phosphoric acid until the runoff is colorless, then washed to neutrality with water and dried at 80° C.

This gives 64.6 parts of coarsely crystalline crude pigment (C.I. Pigment Violet 19, γIII-phase).

A ball mill (manufacturer: Draiswerke GmbH, Mannheim) filled with 418 parts of zirconium mixed-oxide beads with a diameter of 0.3–0.4 mm as grinding media is charged with a suspension consisting of 90 parts of water and 10 parts of coarsely crystalline crude pigment. Grinding is carried out at a tip speed of 15.6 m/s and with a specific power density of 3.1 kW per liter of milling space at 20° C. for 20 minutes. The millbase suspension is subsequently sieved to remove the grinding media, which are washed with water, and the combined millbase suspensions are filtered with suction. The filtercake is introduced into a stirred vessel. Then 50 parts of water and 0.12 part of a 50% strength aqueous alkylphenol polyglycol ether sulfate solution are added. The mixture is heated to 60° C. and stirred at 60° C. for 2 hours. Then a pH of 2 is established by adding 0.08 part of 10% strength hydrochloric acid, the mixture is stirred at 60° C. for 1 hour and the surface-treated pigment is filtered off with suction, washed to neutrality with water and dried at 80° C. This gives 9 parts of surface-treated pigment (C.I. Pigment Violet 19, γIII-phase, with small amounts of α-phase). In the AM lacquer, clean, strongly colored coatings of high opacity are obtained. In the PU lacquer, clean and strongly colored coatings of high transparency are obtained.

Example 14

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 790 parts of 85% strength phosphoric acid and the mixture is hydrolyzed with stirring at 145° C. During hydrolysis, the temperature rises to 160° C. Following hydrolysis, the phosphoric acid strength is 95%. It is then cooled to 90° C. and the crude pigment is filtered off with suction, washed with 85% strength phosphoric acid until the runoff is colorless, then washed to neutrality with water and dried at 80° C.

This gives 67.2 parts of coarsely crystalline crude pigment of C.I. Pigment Violet 19, α-phase.

Example 15

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into a second stirred vessel containing 790 parts of 85% strength phosphoric acid and the mixture is hydrolyzed with stirring at 145° C. During hydrolysis, the temperature rises to 160° C. Following hydrolysis, the phosphoric acid strength is 95%. The mixture is cooled to 145° C. and stirred at 145° C. for 10 hours. It is then cooled to 90° C. and the crude pigment is filtered off with suction, washed with 85% strength phosphoric acid until the runoff is colorless, then washed to neutrality with water and dried at 80° C.

This gives 64.6 parts of coarsely crystalline crude pigment (C.I. Pigment Violet 19, γIII-phase).

A ball mill (manufacturer: Draiswerke GmbH, Mannheim) filled with 413 parts of zirconium mixed-oxide beads with a diameter of 0.3–0.4 mm as grinding media is charged with a suspension consisting of 85.5 parts of water, 4.5 parts of ethanol and parts of coarsely crystalline crude pigment. Grinding is carried out at a tip speed of 15.6 m/s and with a specific power density of 3.1 kW per liter of milling space at 20° C. for 20 minutes. The millbase suspension is subsequently sieved to remove the grinding media, which are washed with water, and the combined millbase suspensions are filtered with suction, and the solid product is washed with water until free from ethanol, and is dried at 80° C.

This gives 8.9 parts of pigment (C.I. Pigment Violet 19, γIII-phase, with small amounts of α-phase). In the PE lacquer, clean, strongly colored coatings of high brightness are obtained. The viscosity is 3.6 s. The solvent fastness is excellent.

Example 16

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour during which ring closure takes place to form the quinacridone. The reaction mixture is then metered over the course of 5 minutes into 2039 parts of 85% strength phosphoric acid at 145° C. and is hydrolyzed. During hydrolysis, the temperature rises to 160° C. Following hydrolysis, the phosphoric acid strength is 90%. The mixture is cooled to 150° C. and stirred at 150° C. for 4 hours. It is then cooled to 90° C. and the crude pigment is filtered off with suction, washed with 85% strength phosphoric acid until the runoff is colorless, then washed to neutrality with water and dried at 80° C.

This gives 64.9 parts of coarsely crystalline crude pigment of C.I. Pigment Violet 19, γIII-phase.

A ball mill (manufacturer: Draiswerke GmbH, Mannheim) filled with 342 parts of zirconium mixed-oxide beads with a diameter of 0.3–0.4 mm as grinding media is charged with a suspension consisting of 85.5 parts of water, 4.5 parts of ethanol and parts of coarsely crystalline crude pigment. Grinding is carried out at a tip speed of 15.6 m/s and with a specific power density of 3.1 kW per liter of milling space at 25° C. for 10 minutes. The millbase suspension is subsequently sieved to remove the grinding media, which are washed with water, and the combined millbase suspensions are filtered with suction, and the solid product is washed with water, and is dried at 80° C.

This gives 9.9 parts of pigment (C.I. Pigment Violet 19, γIII-phase, with small amounts of α-phase). In the AM lacquer, clean, strongly colored coatings of high transparency are obtained.

Example 17

A stirred vessel is charged with 450 parts of polyphosphoric acid containing 85.0% $P_2O_5$. Then 150 parts of 2,5-dianilinoterephthalic acid are introduced with stirring at 125° C., heated to 140° C. and stirred at 140° C. for 1 hour during which ring closure takes place to form the quinacridone. The reaction mixture is then metered over the course of 5 minutes into a second stirred vessel containing 950 parts of 85% strength phosphoric acid and is hydrolyzed at 145° C. with stirring. During hydrolysis, the temperature rises to 165° C. Following hydrolysis, the phosphoric acid strength is 95%. The mixture is cooled to 150° C. and stirred at 150° C. for 5 hours. It is then cooled to 90° C. and the crude pigment is filtered off with suction, washed with 50% strength phosphoric acid until the runoff is colorless, then washed to neutrality with water and dried at 80° C.

This gives 111.4 parts of crude pigment C.I. Pigment Violet 19, γIII-phase with traces of α-phase.

A ball mill (manufacturer: Draiswerke GmbH, Mannheim) filled with 360 parts of zirconium mixed-oxide beads with a diameter of 0.3–0.4 mm as grinding media is charged with a suspension consisting of 90 parts of 1% strength sodium hydroxide solution and 10 parts of coarsely crystalline crude pigment. Grinding is carried out at a tip speed of 15.6 m/s and with a specific power density of 3.1 kW per liter of milling space at 20° C. for 10 minutes. The millbase suspension is subsequently sieved to remove the grinding media, which are washed with water, and the combined millbase suspensions are filtered with suction, and the solid product is washed with water, and is dried at 80° C.

This gives 9.2 parts of pigment (C.I. Pigment Violet 19, γIII-phase, with small amounts of α-phase).

In the AM lacquer, clean, strongly colored coatings of high transparency are obtained.

Example 18

A stirred vessel is charged with 1000 parts of polyphosphoric acid containing 85.0% $P_2O_5$. Then 200 parts of 2,5-dianilinoterephthalic acid are introduced at 90° C. with stirring over 20 minutes. During this addition the temperature rises to 125° C. The mixture is heated at 125° C. for 1.25 hours during which ring closure takes place to form the quinacridone. The reaction mixture is subsequently metered into a static mixer, model ®Kenics KMR (length: 10 cm, diameter: 9 mm, 8 elements, supplier: H. Ott, Neckargmünd) with a volume flow of 3.12 parts by volume per hour in a volume flow of 17.7 parts by volume per hour of 85% strength phosphoric acid at 50° C. and is hydrolyzed in 0.9 second. During this procedure, the temperature rises to 85° C. Following the hydrolysis the phosphoric acid strength is 88.9%. This gives 7821.7 parts of crude pigment suspension. 870 parts of crude pigment suspension are heated to 165° C. in a stirred vessel and are stirred at 165° C. for 5 hours. Subsequently, the suspension is transferred with stirring to a mixture of 2138 parts of water at 25° C. and 2138 parts of ice, and the pigment is filtered off with suction, washed to neutrality with water and dried at 80° C.

This gives 14.3 parts of pigment (C.I. Pigment Violet 19, γIII-phase with traces of α-phase). In the AM laquer, opaque coatings are obtained.

Example 19

A stirred vessel is charged with 450 parts of polyphosphoric acid containing 83.0% $P_2O_5$. Then 90 parts of 2,5-dianilinoterephthalic acid are introduced with stirring at 125° C. and the mixture is heated at 125° C. for 1 hour, during which ring closure takes place to form the quinacridone. The reaction mixture is then metered over the course of 5 minutes into a second stirred vessel containing 2039 parts of 85% strength phosphoric acid and is hydrolyzed at 145° C. with stirring. During this procedure the temperature rises to 150° C. Following the hydrolysis the phosphoric acid strength is 90%. The mixture is stirred at 150° C. for 4 hours. It is then cooled to 90° C. and 1999 parts of water at 25° C. are metered in. Following the addition of water, the phosphoric acid strength is 40%. Then 7.5 parts of pigment dispersant of the formula (II) are added. In this formula (II) P is the radical of linear unsubstituted quinacridone and X is the group of the formula (VI) in which $R^{10}$, $R^{11}$, $R^{12}$ and $R^{13}$ are each a hydrogen atom and m is 2.1. The mixture is stirred at 90° C. for 1 hour. Subsequently, the pigment preparation is filtered off with suction, washed to neutrality with water and dried at 80° C.

This gives 86.8 parts of pigment preparation (C.I. Pigment Violet 19, γII-phase with traces of α-phase). In the AM lacquer, transparent coatings with a very deep shade are obtained.

Example 20

A stirred vessel is charged with 1000 parts of polyphosphoric acid containing 83.0% $P_2O_5$. Then 200 parts of 2,5-dianilinoterephthalic acid are introduced at 90° C. with stirring over 40 minutes. During this addition the temperature rises to 120° C. The mixture is heated to 125° C. and stirred at 125° C. for 1 hour during which ring closure takes place to form the quinacridone. The reaction mixture is then metered into a toothed-disk disperser IKA SD 41 (supplier: Janke u. Kunkel, Staufen) at 13,000 rpm with a stator slot width of 3 mm, with a volume flow of 4.72 parts by volume per hour in a volume flow of 23.5 parts by volume per hour of 85% strength phosphoric acid at 50° C. and is hydrolyzed in 4 seconds. During this procedure, the temperature rises to 84° C. Following the hydrolysis the phosphoric acid strength is 87.9%. This gives 6744.5 parts of crude pigment suspension. 2622 parts of crude pigment suspension are heated to 162° C. in a stirred vessel and are stirred at 162° C. for 5 hours. The mixture is then cooled to 90° C. and 3088 parts of water at 25° C. are run in with stirring. Following the addition of the water, the phosphoric acid strength is 40%. The pigment is subsequently filtered off with suction, washed to neutrality with water and dried at 80° C.

This gives 46.8 parts of pigment (C.I. Pigment Violet 19, γIII-phase with traces of α-phase). In the AM laquer, transparent and deeply colored coatings are obtained.

Substituted Quinacridone Examples

Example 21

A stirred vessel is charged with 100 parts of polyphosphoric acid containing 83.0% $P_2O_5$. Then 20 parts of 2,5-di-(2-chloroanilino)terephthalic acid are introduced at 125° C. with stirring and the mixture is heated at 125° C. for 2 hours during which ring closure takes place to form the quinacridone. The reaction mixture is then metered over the course of 5 minutes into a second stirred vessel containing 318 parts of 70% strength phosphoric acid and is hydrolyzed at 100° C. with stirring. During this procedure the temperature rises to 130° C. Following the hydrolysis, the phosphoric acid strength is 80%. The mixture is heated to 145° C. and stirred at 145° C. for 4 hours. It is then cooled to 90° C. and the hydrolysis mixture is poured into 2940 parts of water at 25° C. with stirring. Thereafter, the pigment is filtered off with suction, washed to neutrality with water and dried at 80° C.

This gives 17.1 parts of 4,11-dichloroquinacridone pigment. In the AM lacquer, transparent and strongly colored coatings are obtained. The rheology is evaluated as being 4–5, the viscosity is 4.4 s, and the gloss measurement gives a value of 77. In the AM lacquer, the pigment is substantially stronger in color, markedly cleaner and markedly glossier than the pigments prepared in accordance with EP-A-0 799 862 and JP-A 9-110867.

Example 22

A stirred vessel is charged with 600 parts of polyphosphoric acid containing 85.0% $P_2O_5$. Then 100 parts of 2,5-di-(3-chloroanilino)terephthalic acid are introduced at 125° C. with stirring and the mixture is heated at 125° C. for 2 hours, during which ring closure takes place to form the quinacridone. The reaction mixture is then metered over the course of 5 minutes into a second stirred vessel containing 1081 parts of 60% strength phosphoric acid and is hydrolyzed at 116° C. with stirring. During this procedure the temperature rises to 134° C. Following the hydrolysis, the phosphoric acid strength is 80%. The mixture is heated to 140° C. and stirred at 140° C. for 2 hours. It is cooled to 25° C. and the hydrolysis mixture is poured into 1690 parts of water at 25° C. with stirring, the pigment is filtered off with suction and washed to neutrality with water. The filter residue is introduced with stirring into 2000 parts of 5% strength potassium hydroxide solution, heated to 80° C. and stirred at 80° C. for 1 hour. The pigment is then filtered off with suction, washed to neutrality with water and dried at 80° C.

This gives 89.7 parts of pigment (C.I. Pigment Red 209). In the AM lacquer, transparent and strongly colored coatings are obtained. The rheology is evaluated as being 5, the viscosity is 3.8 s, and the gloss measurement gives a value of 42. The pigment is somewhat more opacifying, substantially stronger in color and more glossy than the pigment prepared in accordance with EP-A-0 799 862.

Example 23

A stirred vessel is charged with 150 parts of polyphosphoric acid containing 83.0% $P_2O_5$. Then 20 parts of 2,5-di-(3-chloro-4-methylanilino)terephthalic acid are introduced at 125° C. with stirring and the mixture is heated at 125° C. for 1 hour during which ring closure takes place to form the quinacridone. The reaction mixture is then metered over the course of 5 minutes into a second stirred vessel containing 477 parts of 70% strength phosphoric acid and is hydrolyzed at 100° C. with stirring. During hydrolysis the temperature rises to 125° C. Following the hydrolysis, the phosphoric acid strength is 80%. The mixture is heated to 135° C. and stirred at 135° C. for 4 hours. It is cooled to 90° C. and the hydrolysis mixture is poured into 4340 parts of water at 25° C. with stirring. Thereafter, the pigment is filtered off with suction, washed to neutrality with water and dried at 80° C.

This gives 17.1 parts of 2,9-dimethyl-3,10-dichloroquinacridone pigment. In the AM lacquer, transparent and strongly colored coatings are obtained. The rheology is evaluated as being 4, the viscosity is 3.9 s, and the gloss measurement gives a value of 55. The pigment is markedly stronger in color and somewhat cleaner than the pigment prepared in accordance with EP-A-0 799 862.

Example 24

A stirred vessel is charged with 450 parts of polyphosphoric acid containing 83.0% $P_2O_5$. Then 150 parts of 2,5-di-(4-toluidino)terephthalic acid are introduced at 125° C. with stirring and the mixture is heated at 125° C. for 1 hour during which ring closure takes place to form the quinacridone. The reaction mixture is then metered over the course of 5 minutes into a second stirred vessel containing 1940 parts of 85% strength phosphoric acid and is hydrolyzed at 140° C. with stirring. During this procedure the temperature rises to 150° C. Following the hydrolysis, the phosphoric acid strength is 90%. The mixture is stirred at 150° C. for 4 hours. It is cooled to 90° C. and the hydrolysis mixture is poured into 6000 parts of water at 25° C. with stirring. Thereafter, the pigment is filtered off with suction, washed to neutrality with water and dried at 80° C.

This gives 133.4 parts of pigment (C.I. Pigment Red 122, α-phase). The X-ray spectrum shows one strong line for twice the glancing angle, 2θ, at 5,5°, four moderate lines at 11.1°, 14.0°, 25.4° and 27.3°, and eight weak lines at 14.9°, 15.3°, 18.4°, 22.5°, 23.8°, 28.3°, 29.5° and 30.9°. In the AM lacquer, strongly colored coatings are obtained. The rheology is evaluated as being 5, the viscosity is 3.5 s, and the gloss measurement gives a value of 50. The pigment is significantly stronger in color than the pigment prepared in accordance with JP-A-9-110 867, which is in the β-phase. The X-ray spectrum of the β-phase shows two strong lines for twice the glancing angle, 2θ, at 7.3° and 13.9°, one moderate line at 26.9°, and seven weak lines at 5.6°, 14.8°, 16.8°, 17.7°, 22.1°, 25.4° and 28.0°.

Example 25

A stirred vessel is charged with 450 parts of polyphosphoric acid containing 83.0% $P_2O_5$. Then 150 parts of 2,5-di-(4-toluidino)terephthalic acid are introduced with stirring at 125° C. and the mixture is heated at 125° C. for 1 hour during which ring closure takes place to form the quinacridone. The reaction is then metered over the course of 5 minutes into a second stirred vessel containing 1940 parts of 85% strength phosphoric acid and is hydrolyzed at 140° C. with stirring. During this procedure the temperature rises to 150° C. Following hydrolysis, the phosphoric acid strength is 90%. The mixture is stirred at 150° C. for 4 hours. It is then cooled to 90° C. and the hydrolysis mixture is poured into 6000 parts of water at 25° C. with stirring. Thereafter, the pigment is filtered off with suction, washed to neutrality with water and dried at 80° C.

This gives 133.4 parts of pigment (C.I. Pigment Red 122, α-phase).

19 parts of this pigment are mixed mechanically with 1 part of pigment dispersant of the formula (II). In this formula (II) P is the radical of linear unsubstituted quinacridone and X is the sulfonamide group (V) in which $R^7$ is a hydrogen atom, $R^8$ and $R^9$ are each an ethyl group, n is 3.0, o is 1.0 and m is 2.0.

This gives a pigment preparation. In the AM lacquer, transparent and strongly colored coatings are obtained. The rheology is evaluated as being 5, the viscosity is 3.3 s, and the gloss measurement gave a value of 77. The pigment preparation is not flocculated.

Example 26

A pressure vessel is charged with 405.7 parts of polyphosphoric acid containing 85.0% $P_2O_5$. Then 20.3 parts of 2,5-dianilinoterephthalic acid and 60.9 parts of 2,5-di-(4-toluidino)terephthalic acid are introduced at 80 to 90° C. with stirring, and the mixture is heated at 125° C. and stirred at 125° C. for 1 hour during which ring closure takes place to form the quinacridone. The reaction mixture is then metered over the course of 10 seconds into a second pressure vessel containing 184 parts of water and is hydrolyzed at 150° C. under pressure. Following the hydrolysis, the phosphoric acid strength is 89.7%. During this procedure the temperature rises to 180° C. The mixture is cooled to 150° C. and stirred at 150° C. for 3 hours. It is cooled to 90° C. and the hydrolysis mixture is poured into 6000 parts of water at 25° C. with stirring. Thereafter, the mixed-crystal pigment is filtered off with suction, washed to neutrality with water and dried at 80° C.

This gives 74.1 parts of mixed-crystal pigment. In the AM lacquer, transparent and strongly colored coatings are obtained.

Example 27

A stirred vessel is charged with 450 parts of polyphosphoric acid containing 83.0% $P_2O_5$. Then 37.5 parts of 2,5-dianilinoterephthalic acid and 112.5 parts of 2,5-di-(4-toluidino)terephthalic acid are introduced at 125° C. with stirring, and the mixture is heated at 125° C. for 1 hour during which ring closure takes place to form the quinacridone. The reaction mixture is then metered over the course of 5 minutes into a second stirred vessel containing 1431 parts of 70% strength phosphoric acid and is hydrolyzed at 25° C. with stirring. During this procedure the temperature rises to 60° C. Following the hydrolysis, the phosphoric acid strength is 80%. The mixture is heated to 120° C. and stirred at 120° C. for 5 hours. It is cooled to 90° C. and the hydrolysis mixture is poured into 6000 parts of water at 25° C. with stirring. Thereafter, the mixture is heated to 90° C. and the mixed-crystal pigment is filtered off with suction, washed to neutrality with water and dried at 80° C.

This gives 138.3 parts of mixed-crystal pigment. The spectrum is that of the mixed-crystal pigment. The reflections typical of unsubstituted quinacridone cannot be detected. The X-ray spectrum shows one strong line for twice the glancing angle, 2θ, at 5.6°, four moderate lines at 11.2°, 14.0°, 25.7° and 27.4°, and five weak lines at 15.0°, 18.1°, 22.5°, 24.3° and 29.9°. In the AM lacquer, transparent and strongly colored coatings are obtained. The rheology is evaluated as being 4–5 and the viscosity is 3.9 s. The gloss measurement gives a value of 69.

In the PE lacquer, transparent and strongly colored coatings are obtained. The metallic coating is strongly colored. The rheology is evaluated as being 3 and the viscosity is 3.9 s.

In the PUR lacquer, transparent and strongly colored coatings are obtained. The metallic coating is strongly colored. The rheology is evaluated as being 1–3. In the NC print, transparent, strongly colored and highly glossy prints are obtained. The solvent fastness is good.

Example 28

A stirred vessel is charged with 450 parts of polyphosphoric acid containing 83.0% $P_2O_5$. Then 37.5 parts of 2,5-dianilinoterephthalic acid and 112.5 parts of 2,5-di-(4-toluidino)terephthalic acid are introduced at 125° C. with stirring and the mixture is heated at 125° C. for 1 hour during which ring closure takes place to form the quinacridone. The reaction is then metered over the course of 5 minutes into a second stirred vessel containing 1431 parts of 70% strength phosphoric acid and is hydrolyzed at 25° C. with stirring. During this procedure the temperature rises to 60° C. Following the hydrolysis, the phosphoric acid strength is 80%. The mixture is heated to 120° C. and stirred at 120° C. for 5 hours. It is then cooled to 90° C. and the hydrolysis mixture is poured into 6000 parts of water at 25° C. with stirring. Thereafter, the mixture is heated to 90° C. and the mixed-crystal pigment is filtered off with suction, washed to neutrality with water and dried at 80° C.

This gives 138.3 parts of mixed-crystal pigment.

19 parts of mixed-crystal pigment are mixed mechanically with 1 part of pigment dispersant of the formula (II). In this formula (II) P is the radical of linear unsubstituted quinacridone and X is the sulfonamide group (V) in which $R^7$ is a hydrogen atom, $R^8$ and $R^9$ are each an ethyl group, n is 3.0, o is 1.0 and m is 2.0. This gives a pigment preparation. In the AM lacquer, transparent and strongly colored coatings are obtained. The rheology is evaluated as being 5, the viscosity is 3.7 s, and the gloss measurement gave a value of 77. The pigment is not flocculated.

Example 29

A stirred vessel is charged with 200 parts of polyphosphoric acid containing 83.0% $P_2O_5$. Then 20 parts of 2,5-di-(4-carboxamidoanilino)-terephthalic acid are introduced at 125° C. with stirring and the mixture is heated at 125° C. for 1 hour during which ring closure takes place to form the quinacridone. The reaction is then metered over the course of 5 minutes into a second stirred vessel containing 636 parts of 70% strength phosphoric acid and is hydrolyzed at 100° C. with stirring. During this procedure the temperature rises to 130° C. Following the hydrolysis, the phosphoric acid strength is 80%. The mixture is stirred at 140° C. for 4 hours. It is then cooled to 90° C. and the hydrolysis mixture is poured into 5000 parts of water at 25° C. with stirring. The prepigment is then filtered off with suction and washed to neutrality with water. The filter residue is introduced with stirring into 200 parts of 1% strength sodium hydroxide solution and the mixture is stirred at 25° C. for 1 hour. Subsequently, the prepigment is filtered off with suction, washed to neutrality with water and dried at 80° C.

This gives 17.7 parts of prepigment.

For the finish operation, 7.3 parts of prepigment are introduced into 50 parts of N-methylpyrrolidone and the mixture is stirred thoroughly. It is then heated to 150° C. and stirred for 3 hours at this temperature. Subsequently it is cooled to 25° C. and the pigment is filtered off with suction, washed with ethanol until free of N-methylpyrrolidone, and dried at 80° C.

This gives 7.0 parts of 2,9-dicarboxamidoquinacridone pigment. In the AM lacquer, high-opacity and strongly colored coatings with a very clean shade are obtained.

Example 30

A stirred vessel is charged with 500 parts of polyphosphoric acid containing 85.0% $P_2O_5$. Then 25 parts of 2,5-dianilinoterephthalic acid and 75 parts of 2,5-di-(4-toluidino)terephthalic acid are introduced at from 90 to 125° C. with stirring and the mixture is heated at 125° C. for 1 hour during which ring closure takes place to form the quinacridone. The reaction mixture is then metered over the course of 5 minutes into a second stirred vessel containing 1200 parts of 85% strength phosphoric acid and the mixture is hydrolyzed with stirring at 140° C. During hydrolysis, the temperature rises to 160° C. Following the hydrolysis, the phosphoric acid strength is 94%. The mixture is heated to 176° C. and stirred at 176° C. for 4 hours. The hydrolysis mixture is cooled to 90° C. and the solid product is filtered off with suction and washed with 500 parts of 85% strength phosphoric acid until the runoff is colorless. The filter residue is introduced into 2000 parts of water with stirring and stirred for 0.5 hour. Subsequently the crude pigment is filtered off with suction, washed to neutrality with water and dried at 80° C.

This gives 56.4 parts of crude pigment.

A ball mill (manufacturer: Draiswerke GmbH, Mannheim) filled with 411 parts of zirconium mixed-oxide beads with a diameter of 0.3–0.4 mm as grinding media is charged with a suspension consisting of 85 parts of 1% strength sodium hydroxide solution, 5 parts of ethanol and 10 parts of crude pigment. Grinding is carried out at a tip speed of 15.6 m/s and with a specific power density of 3.1 kW per liter of milling space at 20° C. for 20 minutes. The millbase suspension is subsequently sieved to remove the grinding media, which are washed with water, and the combined millbase suspensions are filtered off with suction.

For the finish treatment, the filtercake is introduced into a stirred vessel. Thereafter, 100 parts of water and 0.25 part of a 50% strength aqueous alkylphenol polyglycol ether sulfate solution are added. The combined suspensions are heated to 60° C., adjusted to a pH of 2 by adding 0.25 part of 10% strength hydrochloric acid and stirred at 60° C. for 1 hour. The surface-treated pigment is filtered off with suction, washed to neutrality with water and dried at 80° C.

This gives 9.7 parts of surface-treated mixed-crystal pigment. In the AM lacquer, transparent clean and strongly colored coatings are obtained.

Example 31

A stirred vessel is charged with 800 parts of polyphosphoric acid containing 85.0% $P_2O_5$. Then 100 parts of 2,5-di(3-chloranilo)terephthalic acid are introduced at 125° C. with stirring and the mixture is heated at 125° C. for 2.5 hours during which ring closure takes place to form the quinacridone. The reaction mixture is then metered over the course of 5 minutes into a second stirred vessel containing 4155 parts of 85% strength phosphoric acid and is hydrolyzed at 140° C. with stirring. During hydrolysis, the temperature rises to 160° C. Following the hydrolysis, the phosphoric acid strength is 90%. The mixture is cooled to 150° C. and stirred at 150° C. for 3 hours. It is then cooled to 90° C., and the hydrolysis mixture is poured into 6000 parts of water at 25° C. with stirring. It is then heated to 90° C. and the crude pigment is filtered off with suction and washed to neutrality with water. The filter residue is introduced with stirring into 1680 parts of 5% strength potassium hydroxide solution, and the mixture is heated to 80° C. and stirred at 80° C. for 1 hour. Subsequently, the crude pigment is filtered off with suction, washed to neutrality with water and dried at 80° C.

This gives 83.1 parts of crude pigment.

A stainless steel container filled to 55% of its volume with 3256 parts of stainless steel beads with a diameter of 10 mm as grinding media is charged with 20 parts of crude pigment and 120 parts of dimethylformamide. Grinding is carried out for 24 hours on a roller table at 75% of the critical speed. The millbase is subsequently sieved to remove the grinding media, and the pigment is filtered off with suction, washed with water until free of dimethylformamide, and dried at 80° C. This gives 20 parts of pigment (C.I. Pigment Red 209). In the plastic (PVC), strong colorations are obtained with very good dispersibility. The bleed-fastness is excellent.

Example 32

A stirred vessel is charged with 450 parts of polyphosphoric acid containing 83.0% $P_2O_5$. Then 150 parts of 2,5-di-(4-toluidino)terephthalic acid are introduced at 125° C. with stirring and the mixture is heated at 125° C. for 1 hour during which ring closure takes place to form the quinacridone. The reaction mixture is then metered for hydrolysis over the course of 5 minutes into a second stirred vessel containing 1486 parts of 85% strength phosphoric acid and the mixture is stirred at 140° C. During hydrolysis, the temperature rises to 150° C. Following the hydrolysis, the phosphoric acid strength is 95%. The mixture is heated to 160° C. and stirred at 160° C. for 4.5 hours. Thereafter the mixture is cooled to 90° C. and the crude pigment is filtered off with suction, washed to neutrality and dried at 80° C.

This gives 95.8 parts of crude pigment of C.I. Pigment Red 122, β-phase. A ball mill (manufacturer: Draiswerke GmbH, Mannheim) filled with 398 parts of zirconium mixed-oxide beads with a diameter of 0.3–0.4 mm as grinding media is charged with a suspension consisting of 90 parts of 3% isopropanol and 10 parts of crude pigment of C.I. Pigment Red 122, β-phase. Grinding is carried out at a tip speed of 15.6 m/s and with a specific power density of 3.1 kW per liter of milling space at 20° C. for 20 minutes. The millbase suspension is subsequently sieved to remove the grinding media which are washed with water, and the combined millbase suspensions are filtered off with suction.

For the finish treatment, the filtercake is introduced into a stirred vessel. Thereafter, 100 parts of water and 0.25 part of a 50% strength aqueous alkylphenol polyglycol ether sulfate solution are added. The combined suspensions are heated to 60° C., adjusted to a pH of 2 by adding 0.15 part of 10% strength hydrochloric acid, stirred at 60° C. for 1 hour. The surface-treated pigment is filtered off with suction, washed to neutrality with water and dried at 80° C. This gives 9.5 parts of surface-treated pigment (C.I. Pigment Red 122, α-phase). In the AM lacquer, clean and strongly colored coatings are obtained.

Example 33

A stirred vessel is charged with 450 parts of polyphosphoric acid containing 83.0% $P_2O_5$. Then 37.5 parts of 2,5-dianilinoterephthalic acid and 112.5 parts of 2,5-di-(4-toluidino)terephthalic acid are introduced at 125° C. with stirring and the mixture is heated at 125° C. for 1 hour during which ring closure takes place to form the quinacridone. The reaction mixture is then metered over the course of 5 minutes into a second stirred vessel containing 1731.8 parts of 40% strength phosphoric acid and is hydrolyzed at 25° C. with stirring. During hydrolysis, the temperature rises to 110° C. Following the hydrolysis, the phosphoric acid strength is 55%. The mixture is cooled to 90° C., 823.4 parts of water at 25° C. are added and stirred at 90° C. for 1 hour. Thereafter, the mixed-crystal pigment is filtered off with suction, washed to neutrality with water and dried at 80° C.

This gives 134 parts of mixed-crystal pigment. The spectrum is that of the mixed-crystal pigment. The reflections typical of unsubstituted quinacridone cannot be detected. In the AM lacquer, highly transparent and strongly colored coatings are obtained. The rheology is evaluated as being 3–4 and the viscosity is 3.7 s. The gloss measurement gives a value of 67.

Example 34

A stirred vessel is charged with 450 parts of polyphosphoric acid containing 83.0% $P_2O_5$. Then 37.5 parts of 2,5-dianilinoterephthalic acid and 112.5 parts of 2,5-di-(4-toluidino)terephthalic acid are introduced at 125° C. with stirring and the mixture is heated at 125° C. for 1 hour during which ring closure takes place to form the quinacridone. The reaction is then metered over the course of 5 minutes into a second stirred vessel containing 1431 parts of 70% strength phosphoric acid and is hydrolyzed at 30° C. with stirring. During hydrolysis, the temperature rises to 60° C.

Following the hydrolysis, the phosphoric acid strength is 80%. The mixture is heated to 120° C. and stirred at 120° C. for 5 hours. It is then cooled to 80° C. and 1440 parts of water at 25° C. are metered in. Following the addition of water, the phosphoric acid strength is 45%. Then 7.5 parts of pigment dispersant of the formula (II) are added. In this formula (II) P is the radical of linear substituted 2,9-dimethylquinacridone and X is the group of the formula (VI) in which $R^{10}$, $R^{11}$, $R^{12}$ and $R^{13}$ are each a hydrogen atom and m is the number 3.5. The mixture is stirred at 80° C. for 1 hour. Then the pigment preparation is filtered off with suction, washed to neutrality with water and dried at 80° C.

This gives 141.2 parts of pigment preparation.

19 parts of this pigment preparation are mixed mechanically with 1 part of pigment dispersant of the formula (II). In this formula (II) P is the radical of linear unsubstituted quinacridone and X is the sulfonamide group (V) in which $R^7$ is a hydrogen atom, $R^8$ and $R^9$ are each an ethyl group, n is 3.0, o is 1.0 and m is 2.0. In the AM lacquer, transparent and strongly colored coatings are obtained. The rheology is evaluated as being 34, the viscosity is 4.0 s, and the gloss measurement gave a value of 71. The pigment preparation is not flocculated.

Example 35

A stirred vessel is charged with 900 parts of polyphosphoric acid containing 83.0% $P_2O_5$. Then 60 parts of 2,5-di(4-chloranilino)terephthalic acid are introduced at 125° C. with stirring and the mixture is heated at 125° C. for 3 hours during which ring closure takes place to form the quinacridone. The reaction mixture is then metered over the course of 5 minutes into a second stirred vessel containing 3820 parts of 90% strength phosphoric acid and is hydrolyzed at 140° C. with stirring. During hydrolysis, the temperature rises to 160° C. Following the hydrolysis, the phosphoric acid strength is 95%. The mixture is stirred at 160° C. for 5 hours. It is then cooled to 90° C. and the crude pigment is filtered off with suction, washed with 95% strength sulfuric acid until the runoff is colorless, then washed to neutrality with water and dried at 80° C.

This gives 52.8 parts of crude pigment (mixture of α- and γ-phase).

A ball mill (manufacturer: Draiswerke GmbH, Mannheim) filled with 360 parts of zirconium mixed oxides with a diameter of 0.3–0.4 mm as grinding media is charged with a suspension consisting of 90 parts of water and 10 parts of the crude pigment (mixture of α- and γ-phase). Grinding is carried out at a tip speed of 15.6 m/s and with a specific power density of 3.1 kW per liter of milling space at 20° C. for 10 minutes. The millbase suspension is subsequently sieved to remove the grinding media, which are rinsed with water, and the combined millbase suspensions are filtered off with suction.

This gives 40 parts of 25% strength prepigment filtercake.

For the finish treatment, the filtercake is introduced into 120 parts of 1% strength sodium hydroxide solution. Thereafter, 50 parts of 100% isobutanol are added. The combined suspensions are heated to boiling, stirred at boiling temperature for 3 hours, and then the isobutanol is distilled off at up to 100° C. at the bridge. After cooling to 60° C., the pigment is filtered off with suction, washed to neutrality with water and dried at 80° C. This gives 9.0 parts of pigment (γ-phase). In the plastic (PVC), transparent clean and strong colorations are obtained. The bleed-fastness is excellent.

Example 36

A stirred vessel is charged with 1000 parts of polyphosphoric acid containing 85.0% $P_2O_5$. Then 75 parts of 2,5-di(4-toluidino)terephthalic acid and 60 parts of 2,5-di(4-chloroanilino)terephthalic acid are introduced at 90° C. with stirring over 25 minutes. During this addition the temperature rises to 120° C. The mixture is heated to 125° C. and stirred at 125° C. for 1 hour, and ring closure takes place to form the quinacridone. The reaction mixture is subsequently metered into a static mixer, model Kenics KMR (length: 10 cm, diameter: 9 mm, 8 elements, supplier: H. Ott, Neckargm ünd) with a throughput of 3.3 parts by volume per hour in a volume flow of 27 parts by volume per hour of 70% strength phosphoric acid at 95° C. and is hydrolyzed in 0.9 second (a precipitate is formed). During hydrolysis, the temperature rises to 118° C. Following the hydrolysis the phosphoric acid strength is 77.7%. This gives 4905 parts of crude pigment suspension. After cooling to 60° C., the crude pigment suspension is filtered off with suction, washed to neutrality with water and dried at 80° C.

This gives 55.7 parts of mixed-crystal crude pigment.

A ball mill (manufacturer: Draiswerke GmbH, Mannheim) filled with 360 parts of zirconium mixed-oxide beads with a diameter of 0.3–0.4 mm as grinding media is charged with a suspension consisting of 80.9 parts of water, 4.5 parts of 100% isobutanol, 4.6 parts of 33% strength sodium hydroxide solution and 10 parts of crude pigment. Grinding is carried out at a tip speed of 15.6 m/s and with a specific power density of 3.1 kW per liter of milling space at 20° C. for 15 minutes. The millbase suspension is subsequently sieved to remove the grinding media, washed to neutrality and until free of isobutanol with water and is dried at 80° C.

This gives 9.7 parts of mixed-crystal pigment. In the AM lacquer, transparent and strongly colored coatings are obtained.

Example 37

A stirred vessel is charged with 1000 parts of polyphosphoric acid containing 85.0% $P_2O_5$. Then 150 parts of 2,5-di(4-toluidino)terephthalic acid and 50 parts of 2,5-di (3-chloroanilino)terephthalic acid are introduced at 90° C. with stirring over 40 minutes. During this addition the temperature rises to 103° C. The mixture is heated at 125° C. and stirred at 125° C. for 1.5 hours during which ring closure takes place to form the quinacridone. The reaction mixture is then metered into a toothed-disk disperser IKA SD 41 (supplier: Janke u. Kunkel, Staufen) at 13,000 rpm with a stator slot width of 3 mm, with a volume flow of 3.3 parts by volume per hour in a volume flow of 23.5 parts by volume per hour of 70% strength phosphoric acid at 95° C. and is hydrolyzed in 4.3 seconds (a precipitate is formed). During this procedure, the temperature rises to 102° C. Following the hydrolysis the phosphoric acid strength is 74.6%. This gives 6815 parts of mixed-crystal crude pigment suspension. 1315 parts thereof are heated to 130° C. and are stirred at 130° C. for 5 hours. Thereafter, the mixture is cooled to 70° C. and 1116 parts of water at 25° C. are run in with stirring. Following the addition of the water, the phosphoric acid strength is 40%. The mixed-crystal pigment is subsequently filtered off with suction, washed to neutrality with water and dried at 80° C.

This gives 24.5 parts of mixed-crystal pigment. In the AM lacquer, transparent, deeply colored coatings are obtained.

Example 38

A stirred vessel is charged with 450 parts of polyphosphoric acid containing 83.0% $P_2O_5$. Then 37.5 parts of 2,5-dianilinoterephthalic acid and 112.5 parts of 2,5-di-(4-toluidino)terephthalic acid are introduced at 125° C. with stirring and the mixture is heated at 125° C. for 1 hour during which ring closure taking place to form the quinacridone. The reaction is then metered over the course of 5 minutes into a second stirred vessel containing 1431 parts of 70% strength phosphoric acid and is hydrolyzed at 25° C. with stirring. During hydrolysis the temperature rises to 60° C. Following the hydrolysis, the phosphoric acid strength is 80%. The mixture is heated to 125° C. and stirred at 125° C. for 5 hours. It is then cooled to 90° C., 1900 parts of water at 25° C. are metered in and the mixture is stirred at 90° C. for 1 hour. Thereafter, the mixed-crystal pigment is filtered off with suction, washed to neutrality with water and dried at 80° C.

This gives 133 parts of this mixed-crystal pigment.

19 parts of mixed-crystal pigment are mixed mechanically with 1 part of pigment dispersant of the formula (II). In this formula (II) P is the radical of linear unsubstituted quinacridone and X is the sulfonamide group (V) in which $R^7$ is a hydrogen atom, $R^8$ and $R^9$ are each an ethyl group, n is 3.0, o is 1.0 and m is 2.0. This gives a pigment preparation. In the AM lacquer, transparent and strongly colored coatings are obtained. The rheology is evaluated as being 5, the viscosity is 4.1 s, and the gloss measurement gave a value of 72. The pigment is not flocculated.

What is claimed is:

1. A process for preparing pigments, mixed-crystal pigments and pigment preparations on the basis of linear unsubstituted or substituted quinacridones of the formula (I)

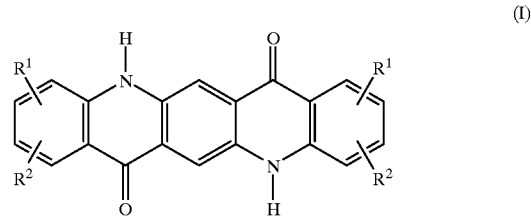

(I)

in which the substituents $R^1$ and $R^2$ are identical or different and are hydrogen, chlorine, bromine or fluorine atoms or $C_1$–$C_4$-alkyl, $C_1$–$C_4$-alkoxy or carboxamido groups, which are optionally substituted by $C_1$–$C_6$-alkyl groups; or are phenoxy rings or $C_6$–$C_{10}$-aryl rings onto which further aromatic, aliphatic or heterocyclic rings are optionally fused, by cyclizing dianilinoterephthalic acid of the formula (Ia)

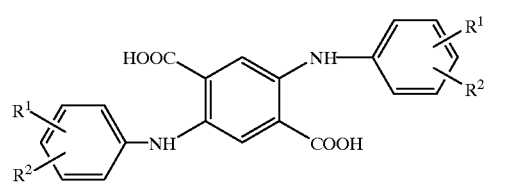

(Ia)

with polyphosphoric acid or polyphosphoric ester to give a ring closure mixture and subsequently hydrolyzing said ring closure mixture comprising quinacridone and polyphosphoric acid or polyphosphoric ester, which comprises metering the ring closure mixture comprising quinacridone and polyphosphoric acid or polyphosphoric ester into an amount of water or aqueous orthophosphoric acid to produce a hydrolysis mixture having a final orthophosphoric acid concentration greater than or equal to 50% by weight.

2. The process as claimed in claim 1, wherein the final orthophosphoric acid concentration is between 75 and 98% by weight.

3. The process as claimed in claim 1, wherein hydrolysis is carried out using an aqueous orthophosphoric acid with a concentration of from 50 to 95% by weight.

4. The process as claimed in claim 1, wherein hydrolysis is carried out using an aqueous orthophosphoric acid with a concentration of from 75 to 90% by weight.

5. The process as claimed in claim 1, wherein the metering of the ring closure mixture is made such to give a concentration gradient of the orthophosphoric acid in the hydrolysis mixture of more than 10% per minute.

6. The process as claimed in claim 1, wherein the hydrolysis is conducted at a temperature between the freezing point of the aqueous orthophosphoric acid or of the water and 200° C.

7. The process as claimed in claim 1, wherein the hydrolysis is conducted at a temperature between 20 and 150° C.

8. The process as claimed in claim 1, wherein the hydrolysis is performed in a static or mechanical mixer.

9. The process as claimed in claim 1, wherein after metering ends, the hydrolysis mixture, containing phosphoric acid, is is brought to temperatures from 20 to 200° C.

10. The process as claimed in claim 1, wherein following the hydrolysis a finish treatment is carried out in an aqueous, aqueous-organic or organic medium; or wherein following the hydrolysis a fine division and, optionally, a finish treatment is carried out.

11. The process as claimed in claim 1, wherein a surface-active agent, a pigment dispersant or a combination thereof is added.

12. The process as claimed in claim 10, wherein the coarsely crystalline pigments are finely divided by wet-grinding in a liquid, aqueous, aqueous-organic or organic medium on a ball mill having a power density of more than 2.5 kW per liter of milling space and at a stirrer tip speed of more than 12 m/s under the action of grinding media whose diameter is less than 1 mm.

13. The process as claimed in claim 10, wherein the finish treatment is carried out with alkanols or carboxamides.

14. The process as claimed in claim 10, wherein the finish treatment is carried out at temperatures of 50 to 200° C. for from 1 to 24 hours.

15. The process as claimed in claim 1, wherein one or more pigment dispersants of the formula (II)

P—Xm                  (II)

is/are added, in which

P is an m-valent radical of a linear quinacridone of the formula (I), in which $R^1$ and $R^2$ are identical or different and are hydrogen atoms or methyl groups, X is a group of the formula (III)

—COOM               (III)

or a group of the formula (IV)

—SO₃M               (IV)

in which

M is the hydrogen ion H⁺ or the equivalent $M^{r+}/r$ of an r-valent metal cation, where r is accordingly one of the numbers 1, 2 and 3; or defines an ammonium ion having the structure $N^+R^3R^4R^5R^6$, where the substituents $R^3$, $R^4$, $R^5$ and $R^6$ are independent of one another and are each hydrogen atoms, $C_1$–$C_{30}$-alkyl, $C_2$–$C_{30}$-alkenyl or $C_5$–$C_{30}$-cycloalkyl groups which optionally are substituted by hydroxyl, di($C_1$–$C_4$-alkyl)amino, carboxyl or carboxamido groups; or are a polyoxyalkylene group of the formula —(CHR¹⁴—CH₂—O—)ₖ—H, in which $R^{14}$ is hydrogen or $C_1$–$C_4$-alkyl and k is a number from 1 to 30; or X is a group of the formula (V)

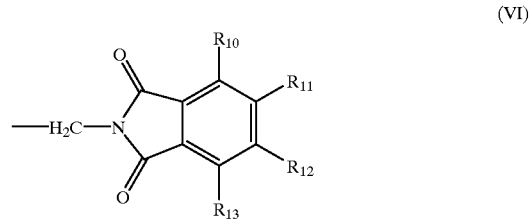

in which $R^8$ and $R^9$ independently of one another are each a hydrogen atom, a $C_1$–$C_{20}$-alkyl, $C_2$–$C_{20}$-alkenyl or $C_5$–$C_7$-cycloalkyl group, or in which $R^8$ and $R^9$, together with the adjacent nitrogen atom, form an aliphatic or aromatic, five- or six-membered heterocyclic system having in each case 1 to 3 ring members comprising identical or different heteroatoms from the series consisting of nitrogen, oxygen and sulfur, $R^7$ is a hydrogen atom or a $C_1$–$C_4$-alkyl group, n is a number from 1 to 6, and o is 0 or 1; or X is a group of the formula (VI)

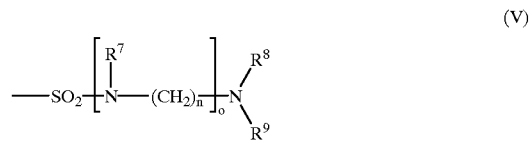

in which $R^{10}$, $R^{12}$ and $R^{13}$ are a hydrogen, fluorine, chlorine or bromine atom and $R^{11}$ is a hydrogen, fluorine, chlorine or bromine atom or a nitro, $C_1$–$C_5$-alkyl, $C_1$–$C_6$-alkoxy or benzoylamino group; and m is a number from 1 to 4.

16. The process as claimed in claim 15, wherein between 0.1 and 20% by weight of pigment dispersant is added per unit weight of quinacridone.

17. The process as claimed in claim 15, wherein between 3 and 10% by weight of pigment dispersant is added per unit weight of quinacridone.

* * * * *